(12) United States Patent
Akriti et al.

(10) Patent No.: US 12,481,704 B2
(45) Date of Patent: Nov. 25, 2025

(54) GHOSTING FOR MULTIMODAL DIALOGS

(71) Applicant: Microsoft Technology Licensing, LLC, Redmond, WA (US)

(72) Inventors: Akriti, Telangana (IN); Kumar Subham, Telangana (IN); Rishab, Telangana (IN); Srimukha Paturi, Telangana (IN); Manish Gupta, Telangana (IN); Puneet Agrawal, Rajasthan (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/509,617

(22) Filed: Nov. 15, 2023

(65) Prior Publication Data

US 2025/0156481 A1    May 15, 2025

(51) Int. Cl.
*G06F 16/00*    (2019.01)
*G06F 16/583*    (2019.01)
*G06F 16/9032*    (2019.01)

(52) U.S. Cl.
CPC ...... *G06F 16/90324* (2019.01); *G06F 16/583* (2019.01)

(58) Field of Classification Search
CPC .......... G06F 16/90324; G06F 16/583
See application file for complete search history.

(56) References Cited

U.S. PATENT DOCUMENTS

| | | | |
|---|---|---|---|
| 10,769,371 B1* | 9/2020 | Barrientos | G06F 16/243 |
| 2023/0047383 A1* | 2/2023 | Yushkina | G06F 16/9535 |
| 2023/0101701 A1* | 3/2023 | Mac an tSaoir | G06F 3/0482 |
| | | | 704/9 |
| 2023/0418861 A1* | 12/2023 | Zhang | G06F 16/535 |

OTHER PUBLICATIONS

International Search Report and Written Opinion received for PCT Application No. PCT/US2024/051686, mailed on Feb. 4, 2025, 13 pages.
Samarinas, et al., "ReLM: An Interactive Interface for Web-based Recommendations using Large Language Models", Retrieved from URL: https://web.archive.org/web/20230911220534if_/https://algoprog.com/files/hci-project-relm.pdf, Sep. 11, 2023, pp. 1-8.

* cited by examiner

*Primary Examiner* — Paul Kim

(57) ABSTRACT

Systems and methods for generating autocomplete text using a language model are disclosed. An image and text-prefix may be entered at an input field of a search application. The image is processed to generate an image description. The image description and the text-prefix signals may be used as input at a language model to generate an autocomplete text by the language model. A contextual history may also be included as input to the language model. The autocomplete text is an output by the language model based on the input at the language model. The auto-complete text may be a next-word ghosting.

20 Claims, 10 Drawing Sheets

GHOSTING FOR MULTIMODAL DIALOGS

BACKGROUND

Autocomplete is a user interface feature that is found in some software applications (e.g., web browsers, search engines, text editors, online forms) that predicts and suggests words, phrases, or commands to a user as they type or enter an input. Autocomplete improves the user experience by reducing the amount of typing, correcting spelling errors, and providing relevant information for the query. Conventional autocomplete systems are often limited in capturing the intent of the user, context, and handling incomplete or ambiguous queries.

It is with respect to these limitations and other considerations that examples have been made. In addition, although relatively specific problems have been discussed, it should be understood that the examples should not be limited to solving the specific problems identified in the background.

SUMMARY

Examples described in this disclosure relate to systems and methods for generating autocomplete text (e.g., ghosted text) for a query based on multimodal inputs. For example, an application, such as a web browser application, may be launched on a computing device. When an input is received at a search field, such as the search field of the web browser, chat interface, or other input field of the application, autocomplete text may be generated through the use of a generative artificial intelligence (AI) model. The input entered may be in different modalities and/or a combination of modalities, such as image, text, audio, or combinations thereof. In examples where an image is provided as input, a description of the image may be retrieved or generated and then used in creating the autocomplete text. The image description may be generated by a generative AI model that processes the input image to generate the image description. The same or different generative AI model uses the image description and the text entered by the user to generate the autocomplete text. In some examples, the generative AI model further includes additional signals, such as conversation history and/or contextual history of the user. The generated autocomplete text may then be displayed in a different format than input text prefix.

In some examples no text is received as input and instead only an image (or other non-text modality input) is received as input. Such an input type may be referred to as a zero-text input. In such examples, the generated autocomplete text may be displayed as a plurality of generated queries or potential input that may be selected by the user. In examples where the user input is non-zero-text, the generated autocomplete text may be displayed as one or more ghosted words in the input field and/or outside of the input field.

When additional text is entered into the input field, new autocomplete text may be generated when the additional text diverges (e.g., does not match) from the previously generated and displayed autocomplete text. For instance, the generative AI model may generate updated autocomplete text based on the additional input entered at the input field.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

DETAILED DESCRIPTION

Examples described in this disclosure relate to systems and methods for generating autocomplete text, based on an input image, using a generative AI model, such as a language model, a large language model (LLM), multimodal model, or other type of generative AI model. In an example implementation, real-time autocomplete text is generated for an input, such as a search query, based on multimodal inputs at an input field, such as a search field of a search application.

As an example, when an image is received as input into a search field, a description of that image is retrieved or generated. For instance, a lookup operation may be performed to determine if a description of the image has been generated before and is available in storage. If the image description is not available, an image description is generated, for example, through the use of a generative AI model. A text prefix may also be received as input to the search field in addition to the image. An AI prompt is then generated that includes the image description and text prefix. In some examples, a text prefix is not received, and the AI prompt does not include the text prefix. The generative AI model then processes the AI prompt to generate an output payload including the autocomplete text based on the text prefix and the image description. The application (e.g., web browser) then surfaces the autocomplete text as a ghosted-text suffix to the text prefix in the search field. As additional text is received in the search field, updated autocomplete text may be generated where the additional text diverges (e.g., does not match) the prior autocomplete text.

Figure 1:
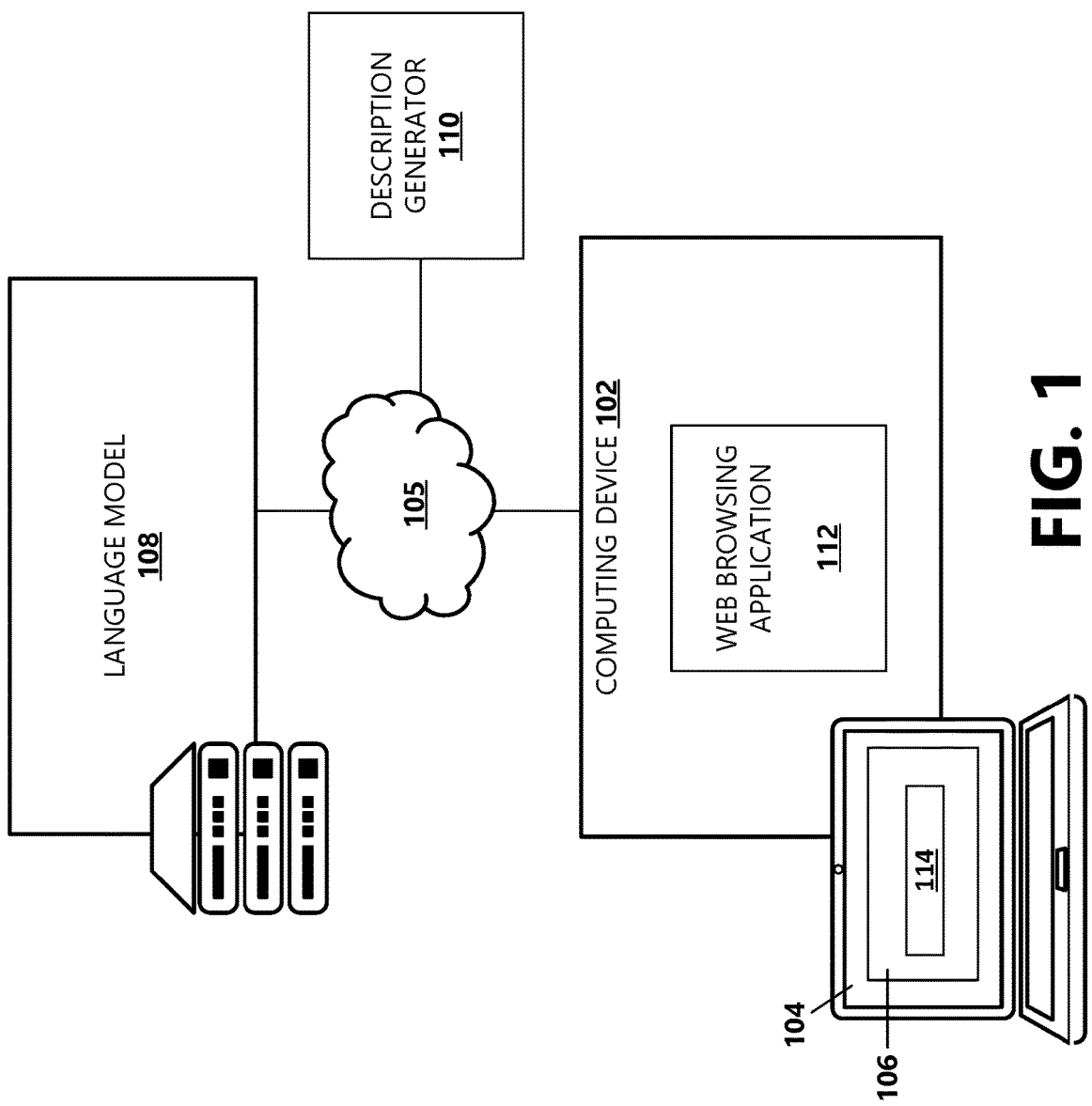
FIG. 1 is a block diagram of a system in which an autocomplete text generation system is implemented according to an example.
Figure 10:
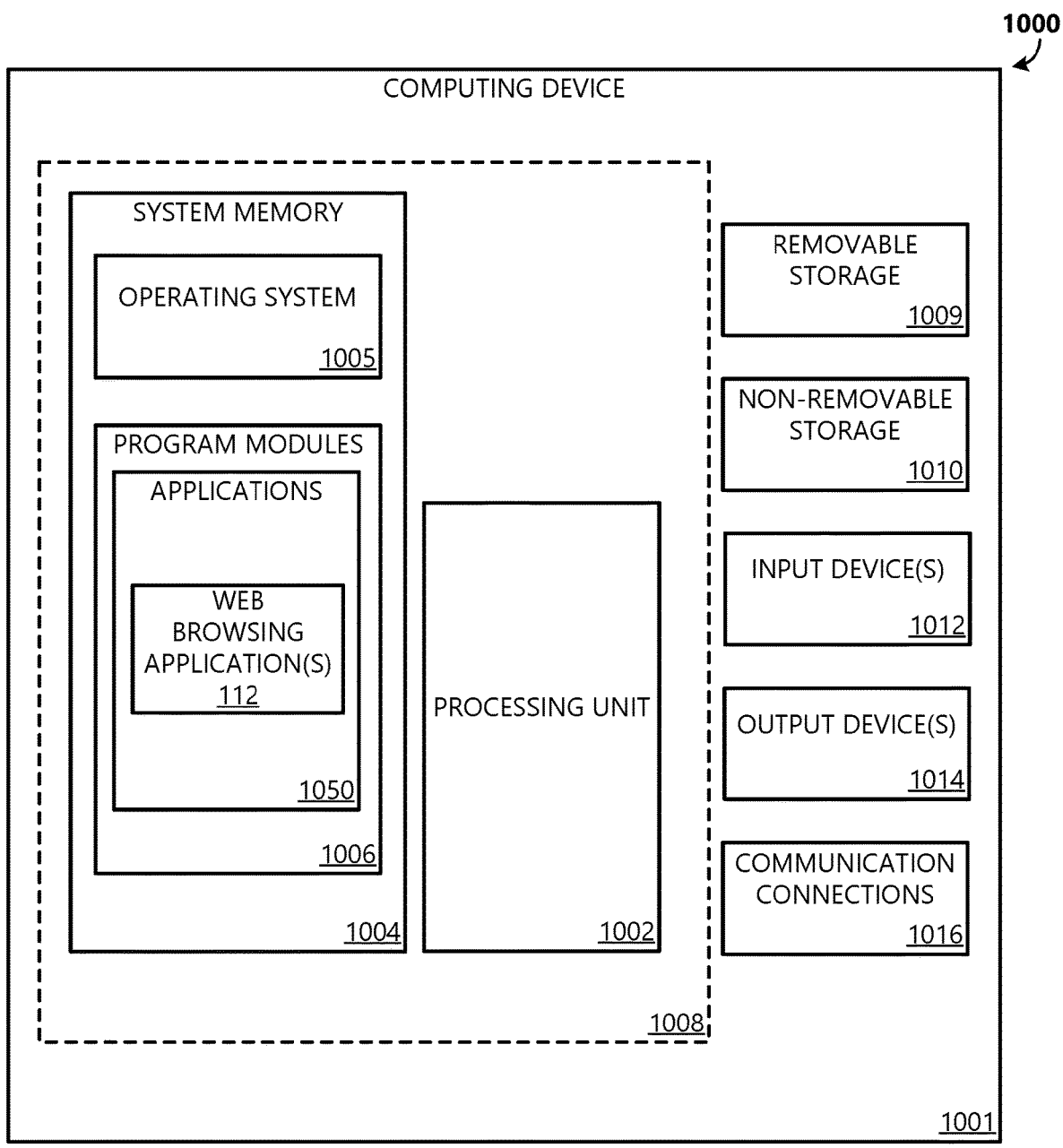
FIG. 10 is a block diagram illustrating example physical components of a computing device with which aspects of the disclosure may be practiced.

FIG. 1 is a block diagram of an example system 100 for generating autocomplete text in accordance with an example. The example system 100, as depicted, is a combination of interdependent components that interact to form an integrated whole. Some components of the system 100 are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. In one example, components of systems disclosed herein are implemented on a single processing device. The processing device may provide an operating environment for software components to execute and utilize resources or facilities of such a system. An example of processing device(s) comprising such an operating environment is depicted in FIG. 10. In another example, the components of systems disclosed herein are distributed across multiple processing devices. For instance, an input may be entered on a user device or client device and information may be processed on or accessed from other devices in a network, such as one or more remote cloud devices or web server devices.

The example system 100 generates autocomplete text using a generative AI model such as a language model 108, which may be an LLM, a multimodal model, or other types of generative AI models. Example models may include the GPT models from OpenAI, BARD from Google, and/or LLaMA from Meta, among other types of generative AI models. The system 100 includes a computing device 102 that may take a variety of forms, including, for example, desktop computers, laptops, tablets, smart phones, wearable devices, gaming devices/platforms, virtualized reality devices/platforms (e.g., virtual reality (VR), augmented reality (AR), mixed reality (MR)), etc. The computing device 102 has an operating system that provides a graphical user interface (GUI) that allows users to interact with the computing device 102 via graphical elements, such as application windows (e.g., display areas), buttons, icons, and the like. For example, the graphical elements are displayed on a display screen 104 of the computing device 102 and can be selected and manipulated via user inputs received via a variety of input device types (e.g., keyboard, mouse, stylus, touch, spoken commands, gesture).

In examples, the computing device 102 includes a plurality of applications for performing different tasks, such as communicating, information generation and/or management, data manipulation, visual construction, resource coordination, calculations, etc. According to an example implementation, the applications include at least one web browser 112. A web browser 112 is an application on a computing device 102 that allow users to access information over a network 105 by using keywords or phrases at the search field 114 of the web browser 112. The keywords or phrases entered at the search field 114 are generally referred to as a query. Queries can have different types, lengths, and intents base on the information that the user want to access on the World Wide Web over the network 105. Some common types of queries include navigational queries, informational queries, transactional queries, and more. Navigational queries aim to find a specific website or webpage. Informational queries seek to learn more about a topic or answer a question. Transactional queries intend to perform an action or complete a task. In some instances, a combination of different types of queries may be used to perform a search.

In examples, web browser 112 provide interfaces for searching for or accessing web pages, images, news, videos, and other types of content that matches the query entered at the search field 114. The query can be entered at the search field 114 of the web browser 112 using various formats, such as text, images, and/or audio. In some examples, the search field 114 is provided by a web page (e.g., search engine) that is accessed via the web browser 112. Example of web browser 112 include, but are not limited to, BING, FIREFOX, GOOGLE CHROME, SAFARI, and the like. The web browser 112 has one or more application UIs 106 by which a user can view and interact with features provided by the web browser 112. For example, an application UI 106 may be presented on the display screen 104. The web browser 112 has an input field 114 that supports multimodal input. For example, the input field 114 may receive data in combination of modalities (e.g., text, images, audio). In some examples, UIs 106 supports a chat feature that allows a user to interact with the web browser 112 using a chatbot such as BING CHAT through an agent interface. The chatbot may interact with a user through various communication means such as text or voice. The chatbot may use different technologies for generating natural language, such as AI, natural language processing (NLP), machine learning (ML), and deep learning (DL).

According to examples, the system 100 further includes a description generator 110 that generates or retrieves an image description for an image, as discussed further herein. In some examples, an image may be received as input at the search field 114 when starting an interaction with the web browser 112. According to an example, the description generator 110, one or more components thereof, is hosted on a separate device that is accessible over the network 105 via an application programming interface (API). As will be described in further detail below, the description generator 110 provides functionality for generating image description that may be incorporated into an input prompt for the language model 108.

In an example, an AI prompt is generated that includes the image description and any text prefix received in the search field 114. The prompt is then provided as input to the language model 108, generates an output payload, in response to the prompt, that includes the autocomplete text. In some examples, a contextual history is created or accessed by the web browser 112. Such contextual history may include prior searches, prior turns in a conversation, browsing history, and/or other context. Where such contextual history is available, the contextual history may also be incorporated into the prompt that is provided to the language model 108 to cause the generation of the autocomplete text. The autocomplete text included in the output payload from the language model 108 is then displayed, or caused to be displayed, at the search field 114 as suffix text to the prefix text that has been received in the search field 114. These and other examples are described below in further detail with reference to FIGS. 2-5.

According to example implementations, the language model 108 is trained to understand and generate sequences of tokens, which may be in the form of natural language (e.g., human-like text). In various examples, the language model 108 can understand complex intent, cause and effect, perform language translation, semantic search classification, complex classification, text sentiment, summarization, summarization for an audience, and/or other natural language capabilities.

In some examples, the language model 108 is in the form of a deep neural network that utilizes a transformer architecture to process the text it receives as an input or query. The neural network may include an input layer, multiple hidden layers, and an output layer. The hidden layers typically include attention mechanisms that allow the language model 108 to focus on specific parts of an input, and to generate context-aware outputs. Language model 108 is generally trained using supervised learning based on large amounts of annotated text data and learns to predict the next word or the label of a given text sequence.

The size of a language model 108 may be measured by the number of parameters it has. For instance, as one example of an LLM, the GPT-4 model from OpenAI has billions of parameters. These parameters may be weights in the neural network that define its behavior, and a large number of parameters allows the model to capture complex patterns in the training data. The training process typically involves updating these weights using gradient descent algorithms, and is computationally intensive, requiring large amounts of computational resources and a considerable amount of time. The language model 108 in examples herein, however, is pre-trained, meaning that the language model 108 has already been trained on the large amount of data. This pre-training allows the model to have a strong understanding of the structure and meaning of an input, which makes it more effective for the specific tasks discussed herein.

The language model 108 may operate as a transformer-type neural network. Such an architecture may employ an encoder-decoder structure and self-attention mechanisms to process the input (e.g., the text, image description or contextual history). Initial processing of the input data may include tokenizing the input into tokens that may then be mapped to a unique integer or mathematical representation. The integers or mathematical representations combined into vectors that may have a fixed size. These vectors may also be known as embeddings.

The initial layer of the transformer model receives the token embeddings. Each of the subsequent layers in the model may uses a self-attention mechanism that allows the model to weigh the importance of each token in relation to every other token in the input. In other words, the self-attention mechanism may compute a score for each token pair, which signifies how much attention should be given to other tokens when encoding a particular token. These scores are then used to create a weighted combination of the input embeddings.

In some examples, each layer of the transformer model comprises two primary sub-layers: the self-attention sub-layer and a feed-forward neural network sub-layer. The self-attention mechanism mentioned above is applied first, followed by the feed-forward neural network. The feed-forward neural network may be the same for each position and apply a simple neural network to each of the attention output vectors. The output of one layer becomes the input to the next. This means that each layer incrementally builds upon the understanding and processing of the data made by the previous layers. The output of the final layer may be processed and passed through a linear layer and a softmax activation function. This outputs a probability distribution over all possible tokens in the model's vocabulary. The token(s) with the highest probability is selected as the output token(s) for the corresponding input token(s).

In example implementations, the language model 108 and description generator 110 operates on a device located remotely from the computing device 102. For instance, the computing device 102 may communicate with the language model 108 and description generator 110 using one or a combination of networks 105 (e.g., a private area network (PAN), a local area network (LAN), a wide area network (WAN)). In some examples, the language model 108 is implemented in a cloud-based environment or server-based environment using one or more cloud resources, such as server devices (e.g., web servers, file servers, application servers, database servers), personal computers (PCs), virtual devices, and mobile devices. The hardware of the cloud resources may be distributed across disparate regions in different geographic locations.

Figure 2:
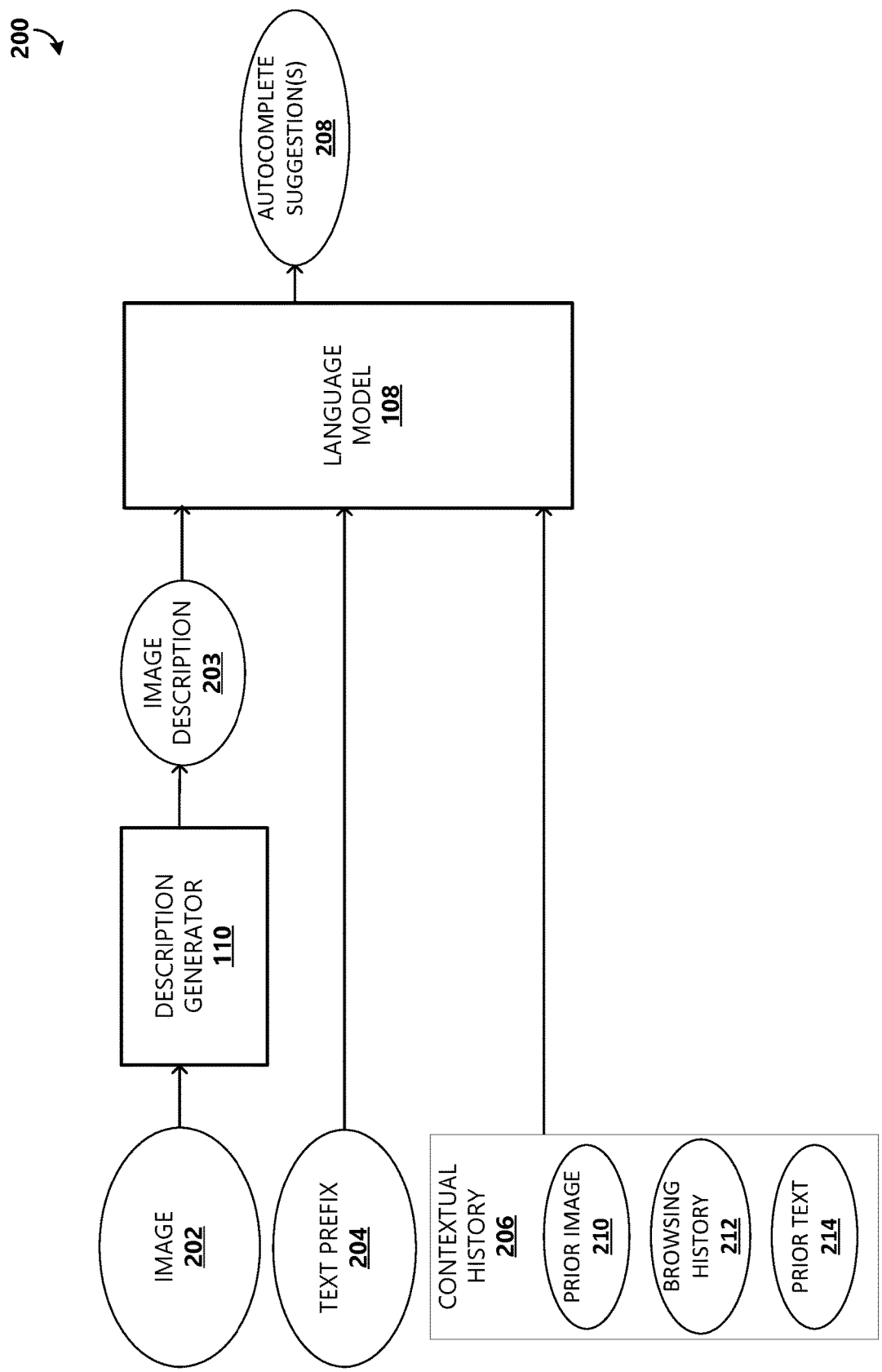
FIG. 2 is a block diagram of example components of an autocomplete suggestion system.

FIG. 2 is a block diagram of example components for an autocomplete text generation system 200. System 200 includes the description generator 110 and the language model 108. The description generator 110 and the language model 108 receive one or more inputs, such as an image 202, a text prefix 204, and/or a contextual history 206. The image 202 and the text prefix 204 may be received at the input field 114 of the web browser 112. The contextual history 206 may include data from prior interactions with the application, such as prior searches and or turns in a conversation with a chatbot interface. For instance, the contextual history 206 may include a prior image 210, a browsing history 212, and/or a prior text 214 that was received from a user and/or displayed to a user.

The forms of the inputs and/or manner of receiving or accessing the inputs may vary across different examples of the technology disclosed herein. In some examples, the image 202 is uploaded at the input field 114 of the web browser 112 by a user on a computing device 102 using UI 106. The image 202 may be a two-dimensional representation of an object, entity, substance, individual, being, etc. In instances, the image 202 may depict the appearance, shape, color, texture, or details of an object or a scene. In instances, the image 202 may convey a message, emotion or an idea. In instances, the image 202 is a raster image made up of pixels in various formats such as, but not limited to, JPEG, PNG, GIF, or BMP. In instances, the image 202 is an animated image showing movement or change over time in various formats including, but not limited to, GIF, APNG, WebP, and MNG. In some examples, a text prefix 204 may be received, in addition to the image 202, at the input field 114 of the web browser 112 on the computing device 102.

The prior image 210 of the contextual history 206 may include one or more images that have been previously received as input at the search field 114 of the web browser 112. In some examples, the prior image 210 does not include the image itself but rather the image description 203 that was previously generated for the prior image 210. The browsing history 212 for the user may be accessed and stored by the web browser itself. In some examples, the browsing history 212 includes recent web pages that have been accessed by the web browser and/or web pages that are currently open in other windows or tabs of the web browser. The contextual history may include prior text 214 that has been received from the user or displayed. For instance, prior queries and responses to those queries may be included as the prior text 214. As an example, in a chatbot interface, the prior turns of the conversation may be included in the contextual history.

The description generator 110 receives the image 202 to generate a description 203 for the image 202, as discussed further herein. The image description 203 is then used as input to the language model 108. In some instances where the text prefix 204 is received, the text prefix 204 is also used as input to the language model 108 with the image description 203 and/or the contextual history 206.

For instance, the image description 203, the text prefix 204, and/or the contextual history 206 may be incorporated into a prompt that is provided to the language model 108 for processing. The prompt may be an input sequence that typically includes text data but may also include other modes of input (e.g., image data). Generation of the prompt, in some examples, includes accessing a template that includes static segments and dynamic segments with placeholders for dynamic data, such as the image description 203, the text prefix 204, and/or the contextual history 206. The static segments may include instructions and requests for the language model 108 that define and explain the particular evaluation task that is being requested, such as a request to generate autocomplete text based on the dynamic data. The static segments may also include formatting instructions that instruct how the output from the language model 108 should be formatted.

The language model 108 processes the prompt and generates an output payload including the autocomplete suggestion(s) 208, which may be in the form of a text suffix that is to be appended to the text prefix 204. The autocomplete suggestion(s) 208 are then surfaced (e.g., displayed) on the display screen 104 of the computing device 102 using UI 106. In some examples, the autocomplete suggestion 208 is displayed in the same input field as the text prefix 204 in a format different from the text prefix 204 (e.g., a ghosted format). In some instances, the displayed autocomplete suggestion(s) 208 may be updated based on a new or additional received input, such as additional prefix text at the input field 114 of a web browser 112.

Figure 3:
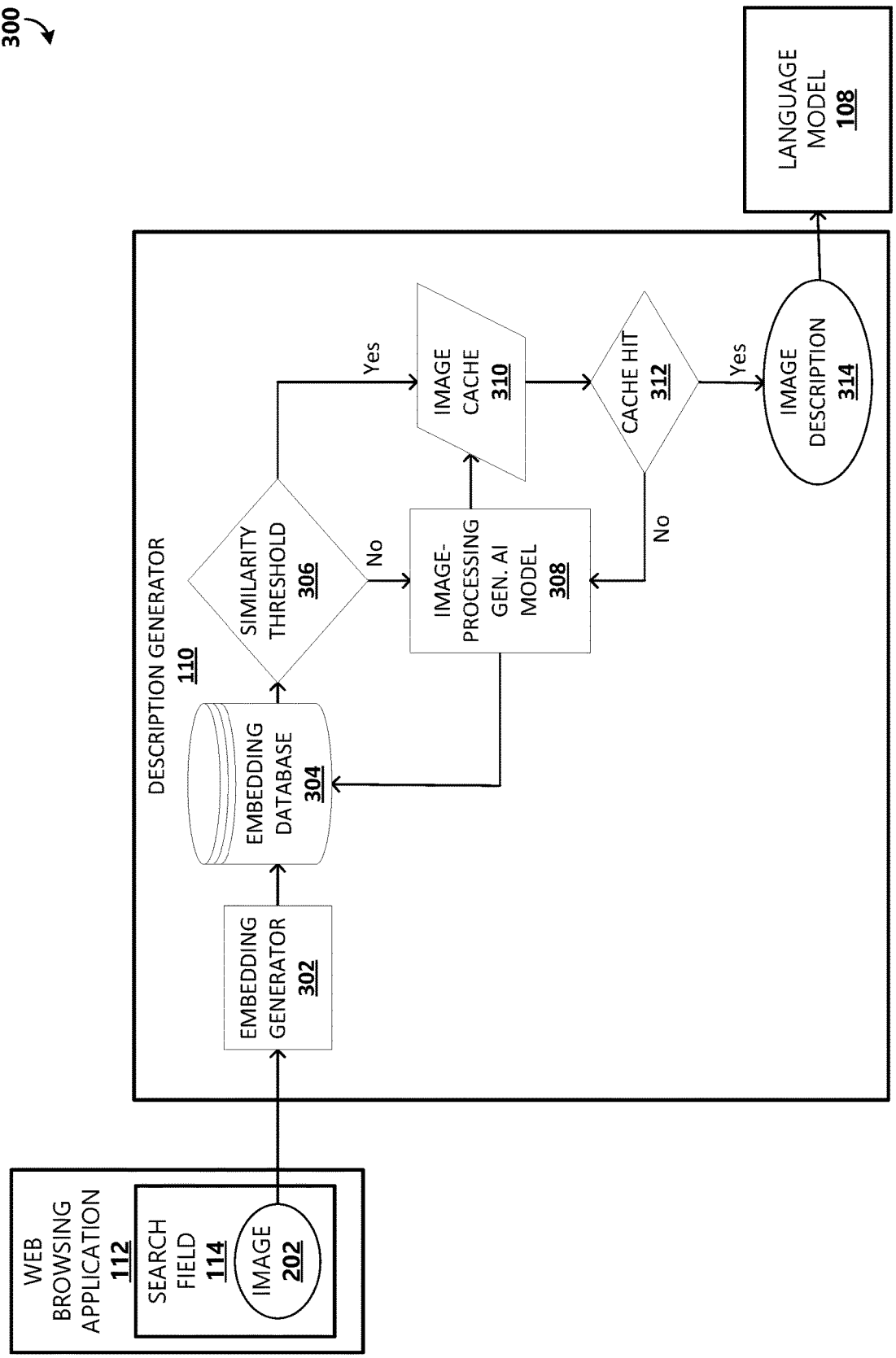
FIG. 3 is a block diagram of example components of an autocomplete suggestion system.

FIG. 3 is a block diagram of example components of an autocomplete text generation system 300. The system 300 includes the description generator 110 that includes an embedding generator 302, an image processing generative AI model 308, an embedding database 304, and an image cache 310.

In the example depicted, the web browser 112 receives an image 202 at a search field 114. The web browser 112 is in communication with the description generator 110 and provides the image 202 to the description generator 110. The description generator 110 generates an image description 314. The image description 314 is then provided as input to language model 108, such as in a prompt including additional information such as the text prefix.

The embedding generator 302 of the description generator 110 receives the image 202 to generate an image embedding for the image 202. The image embedding generated by the embedding generator 302 is a numerical representations of the image 202 that captures the features and information of the image 202 in a vector and/or matrix format. For instance, the embedding for the image 202 is a vector representation of the image 202. In some sense, the embeddings serves a compact, mathematical representation of the image that captures the salient features of the image 202. The image embeddings may then be used for further operations, such as comparisons to other embeddings in the embedding space (e.g., vector space).

The embeddings generator 302 may generate the image embeddings using various techniques or methods, such as through the use of a generative AI model, convolutional neural networks (CNNs), and/or or deep learning models that generate an embedding from an image. For instance, various features and characteristics of the image 202 may be captured such as color, shape, texture, and content within the embedding.

Once the embedding for the image 202 is generated, that image embedding may be compared to other image embeddings in an embedding database 304. The embeddings in the embedding database 304 include previously generated image embeddings of other images for which image descriptions have been previously generated. For instance, when an image description is generated for a particular image, the embedding for that image is then stored in the embedding database and the corresponding image description is stored separately in another database or image-description cache 310.

A similarity score between the embedding for image 202 and the embeddings in the embedding database 304 is then generated. The similarity score may be generated from a cosine similarity function or other types of comparison. In some examples, the system 300 employs an approximate nearest neighbor (ANN) lookup to produce the similarity score. The ANN lookup finds the nearest vectors (e.g., embeddings) to the image embedding for the image 202. In some examples, the ANN lookup may perform more efficiently as the ANN search may not need to exhaustively compare the image embedding to each embedding within the embedding database.

The similarity score is compared to the similarity threshold at comparison 306. If the similarity score is higher than the similarity threshold, there is likely to be a matching image for which an image description has been previously generated. If the similarity score is less than the similarity threshold, it is unlikely that a description for image matching the image 202 has previously been generated.

In instances where the similarity score passes the similarity threshold (e.g., is greater than or equal to the similarity threshold), an image cache is queried to identify the image corresponding to the matching embedding. For instance, the image cache include the images or identifiers of images for which image descriptions have been previously generated. If a cache hit 312 successfully occurs (e.g., the matching image is identified in the cache), the image description 314 for the matching image is retrieved and used as the image description for input image 202. The image description for the matching image may be stored with the matching image in the image cache and/or in a different location that is accessible to the description generator 110. Accordingly, by using a previously generated image description, an additional call to a generative AI model can be avoided for the generation of the image description 314, thus saving processing resources associated with such an additional call.

If the similarity threshold is not passed in comparison operation 306 or if a cache hit 312 fails (e.g., no cache hit, no matching image can be retrieved from the image cache 310), a new image description for the input image 202 is generated through the use of an image-processing generative AI model 308. For instance, the input image 202 is incorporated into an image description prompt that includes instructions to the image-processing generative AI model 308 to cause the image-processing generative AI model 308 to generate an output payload including the image description 314 for the input image 202.

When the new image description is generated for the input image 202, the embedding for the input image is stored in the embedding database 304, and the input image 202 is added to the image cache 310. Accordingly, the newly generated image description may then be potentially used for future input images that are received by the system, thereby reducing or eliminating future redundant calls to the generative AI model 308, which would unnecessarily utilize additional processing resources.

Once the image description 314 for the input image 202 is generated or retrieved by the description generator 110, the image description 314 is incorporated into a prompt that is provided to the language model 108, as discussed further herein.

Figure 4:
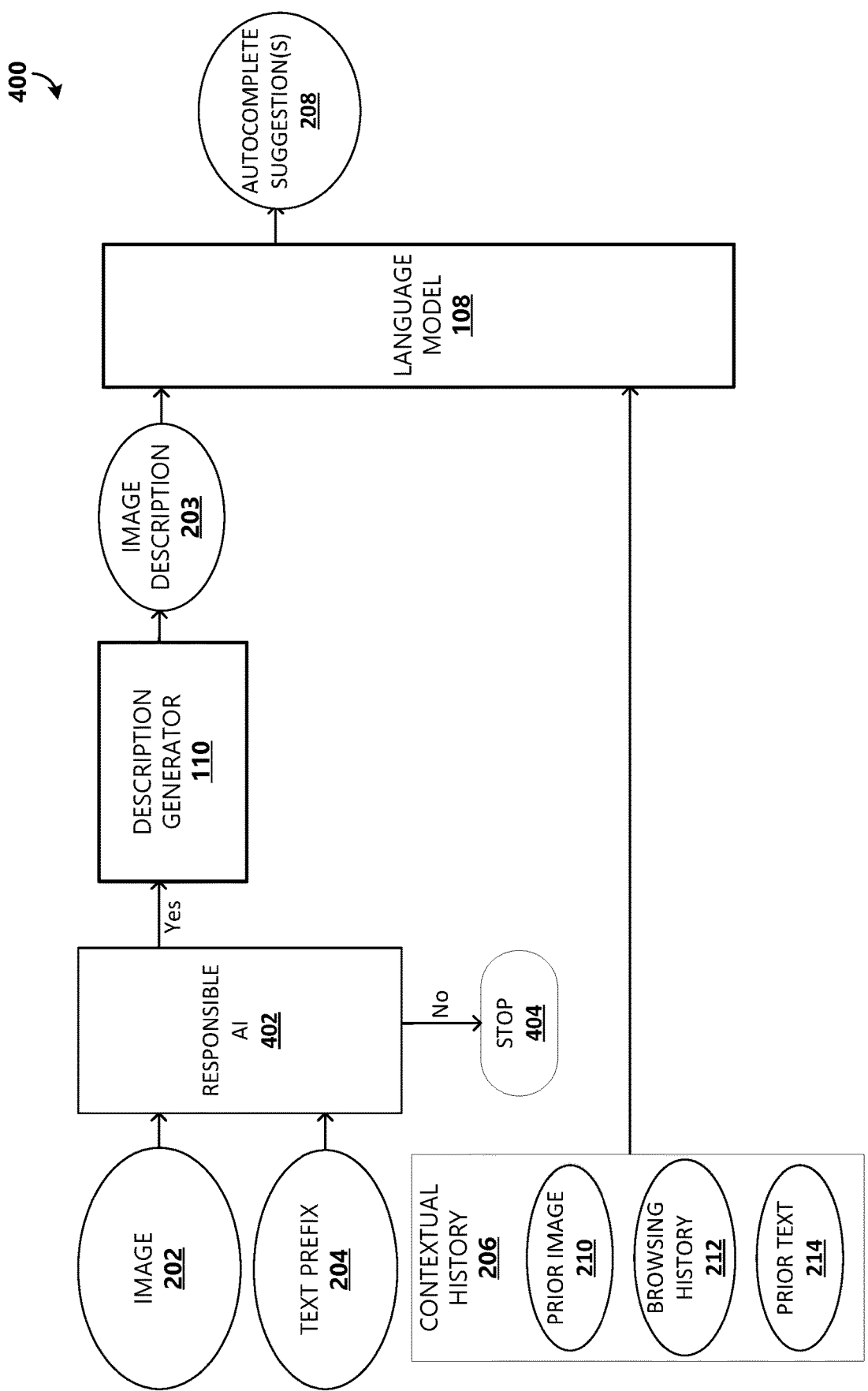
FIG. 4 is a block diagram of example components of an autocomplete suggestion system.

FIG. 4 is a block diagram of example components of an autocomplete text generation system 400. The system 400 is substantially similar to the system 200 discussed above with respect to FIG. 2, with the exception that the system 400 includes a responsible artificial intelligence (RAI) subsystem 402. The RAI subsystem 402 evaluates the input image 202 and/or the input text prefix 204 to ensure compliance with particular policies, such that the input(s) are appropriate inputs. The RAI subsystem 402 evaluates the input image 202 and/or the input text prefix 204 by executing a set of rules and/or steps to prevent and mitigate the display or injection of harmful and/or inappropriate content by or into the system 400 based on inputs at the search field 114 of the web browser 112. Harmful and inappropriate content includes hate speech, misinformation, pornography, violence, and/or other forms of offensive or illegal content. The steps include identify and prioritize potential harms that could result from an input received at the search field 114.

The operations performed by the RAI subsystem 402 may include evaluating the input image 202 and the input text prefix 204 against a set of heuristics to identify potentially inappropriate content. The input image 202 and/or input text prefix 204 may also be evaluated with a specifically trained machine learning model that identifies potential inappropriate content. If the input image 202 and/or the input text prefix 204 is found to include appropriate content, the input image 202 and the input text prefix 204 are passed further into the system 400 where they continued to be processed as discussed herein. If the input image 202 and/or the input text prefix 204 are found to have inappropriate content, a stop function 404 is performed that prevents the inappropriate content from reaching further stages of the system 400. The stop function 404 may include surfacing an alert or notification to the user that the input image 202 and/or the input text prefix 204 was found to be inappropriate. The stop function 404 may also include transmitting a flag to administrative account or other service to indicate the presence of an inappropriate input from the user. By performing the RAI check early in the input process (e.g., before a call to a generative AI model), unnecessary calls to the image generation and generative AI components of the present technology may be avoided.

Figure 5:
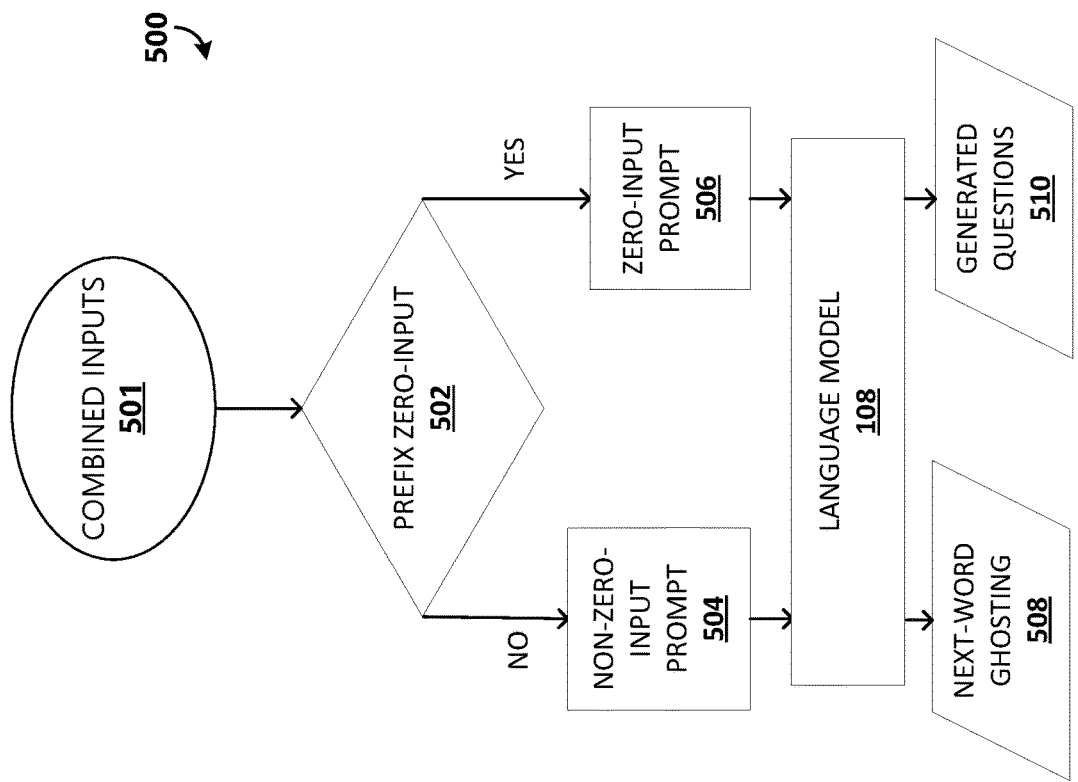
FIG. 5 depicts a process flow for handling both zero-input prefixes and non-zero-input prefixes.

FIG. 5 depicts a process flow 500 for handling both zero-input prefixes and non-zero-input prefixes. The combined inputs 501, such as the input image 202, the input text prefix 204 (if any), and the contextual history 206 (if any) are received as input in the process flow 500. At decision operation 502, a determination is made as to whether any text prefix 204 has been entered into the input field (e.g., has the user entered text into the input field) 114. When a text prefix 204 has been entered, the prefix is considered to be a non-zero input. When a text prefix 204 has not been entered, the prefix is considered a zero-input prefix.

Where the prefix is a non-zero input (e.g., text has been received), the process flows to operation 504 wherein a non-zero-input prompt is accessed and used to generate the autocomplete text discussed herein. For instance, a non-zero-input prompt template may be accessed that includes static portions with instructions that are specific to generating autocomplete text that is a suffix to the text prefix. The combined inputs 501 are then incorporated into the non-zero-input prompt template to form the non-zero-input prompt, and the non-zero-input prompt is provided as input to the language model 108. The language model 108 processes the non-zero-input prompt and generates an output payload with the autocomplete text, which may be in the form of a next-word ghosting 508.

Where the prefix determined to be a zero-input prefix at determination operation 502, the process flows to operation 506 where a zero-input prompt is accessed and used to generate one or more example inputs, such as potential question or query for the user to enter. For example, where no text input has been received in the input field, there is no text to "complete." As such, rather than generating autocomplete text, the system is able to generate potential text inputs for the user to enter. The generation of the potential text inputs are still, however, based on the image (or other non-text modality input) and the contextual history (where used). More specifically, the zero-input prompt may be generated by accessing a zero-input prompt template that includes static portions including instructions that are specific to the zero-input scenario. For instance, the instructions in the static portions instruct the language model 108 to generate the potential text inputs. The zero-input prompt is then generated by incorporating the combined inputs into the zero-input prompt template. The zero-input prompt is provided as input to the language model 108, which then generates a responsive output payload that includes the potential text inputs, which may be in the form of one or more queries or questions for the user to submit based on the input image (and contextual history where available).

Figure 6:
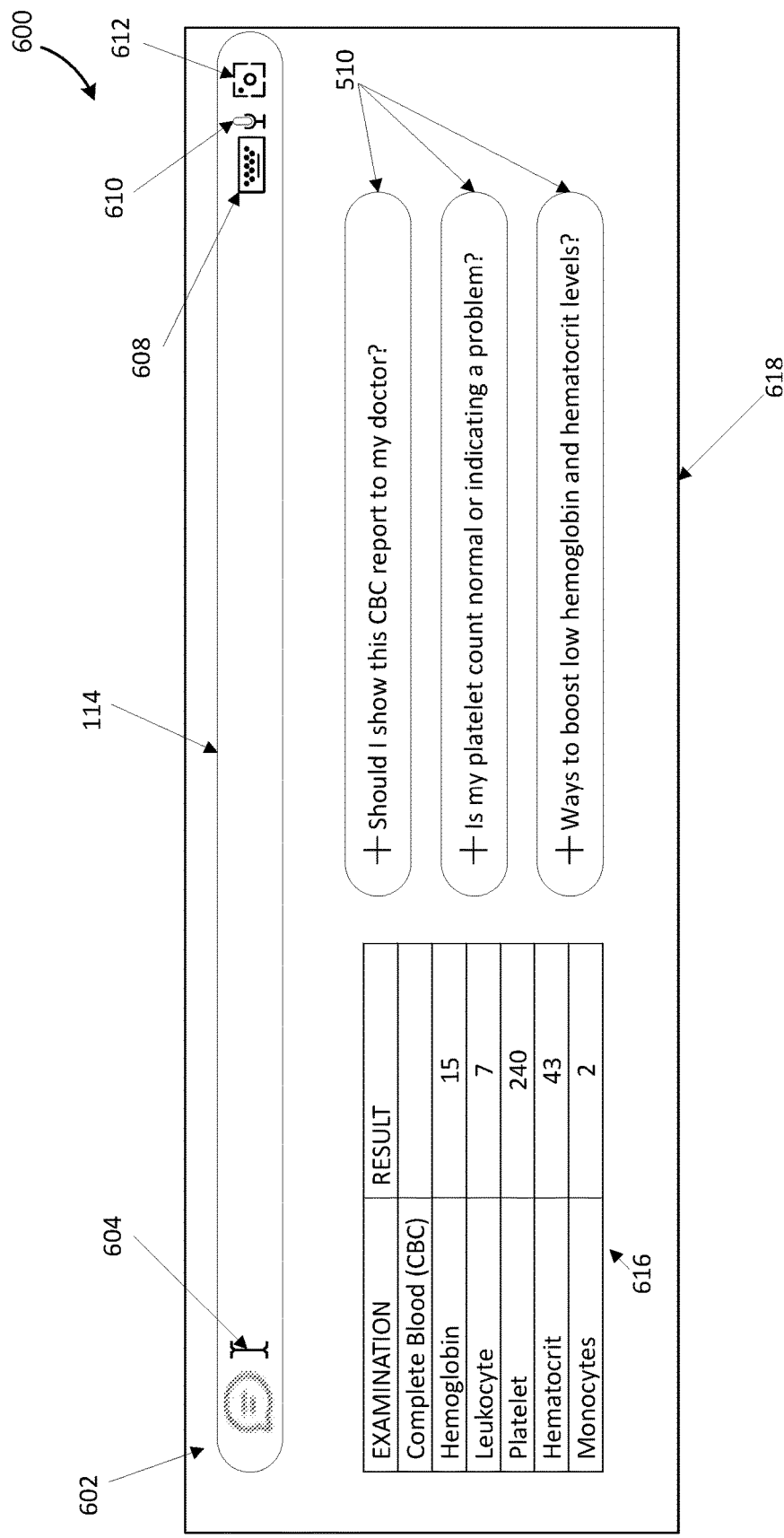
FIG. 6 depicts an example interface for generating autocomplete text suggestion.

An example set of interfaces will now be discussed with reference to FIGS. 6-8. In these figures, an example series of turns with a chat and/or search application are shown. In FIG. 6 an example interface 600 for generating potential inputs and autocomplete suggestion(s) is shown. The example interface 600 includes a web browser interface 618, an input field 114, chat interface 602, text cursor 604, text input UI element 608, audio input UI element 610, image input UI element 612, and an uploaded image 616 (which is a picture of a medical lab report in this example). For example, a user may launch a web browser 618 such as the GOOGLE CHROME browser, the BING browser, or the FIREFOX browser, among others. In some instances, the user may choose to perform a search or chat using the chat interface 602 of the web browser 618. The user may access information on the World Wide Web by entering a query at the input field 114 of the web browser 618.

In some examples, the user may enter text as a query by typing or otherwise entering text into the input field 114. In some examples, the user may enter audio input into the input field 114 using the audio input UI element 610. The user may also provide image input into the input field 114 by selecting the image input UI element 612. For example, a user may visit the web browser 618 input the image 616 into the input field 114.

In the example depicted in FIG. 6, the input image 616 that has been entered is an image or picture of a medical report including lab results. In addition, there is no text entered into the input field. Thus, a zero-input prefix condition is present. As a result, the zero-input prompt is generated that includes a description of the input image 616. The language model generates an output payload that includes the three potential questions 510. The potential questions 510 are surfaced to the user via the application. In the example depicted, the potential questions 510 are each displayed separately and outside of the input field. In other examples, one or more of the potential questions 510 are displayed within the input field, such as in a ghosted format. The surfaced (e.g., displayed) potential questions 510 may also each be selectable. Upon receiving a selection of the potential question, the selected question is provided as an input and executed by the search and/or chat application to provide a response to the user based on the selected question and the input image 616.

In some examples, a text prefix may then be received in the input field 114 after the surfacing of the potential questions, which triggers a non-zero-input scenario. In such examples, the technology then generates autocomplete text based on the input text prefix and the input image 616. The autocomplete text may then be surfaced with the potential questions and/or surfacing of the autocomplete text may cause the removal of the potential questions from the display.

Figure 7:
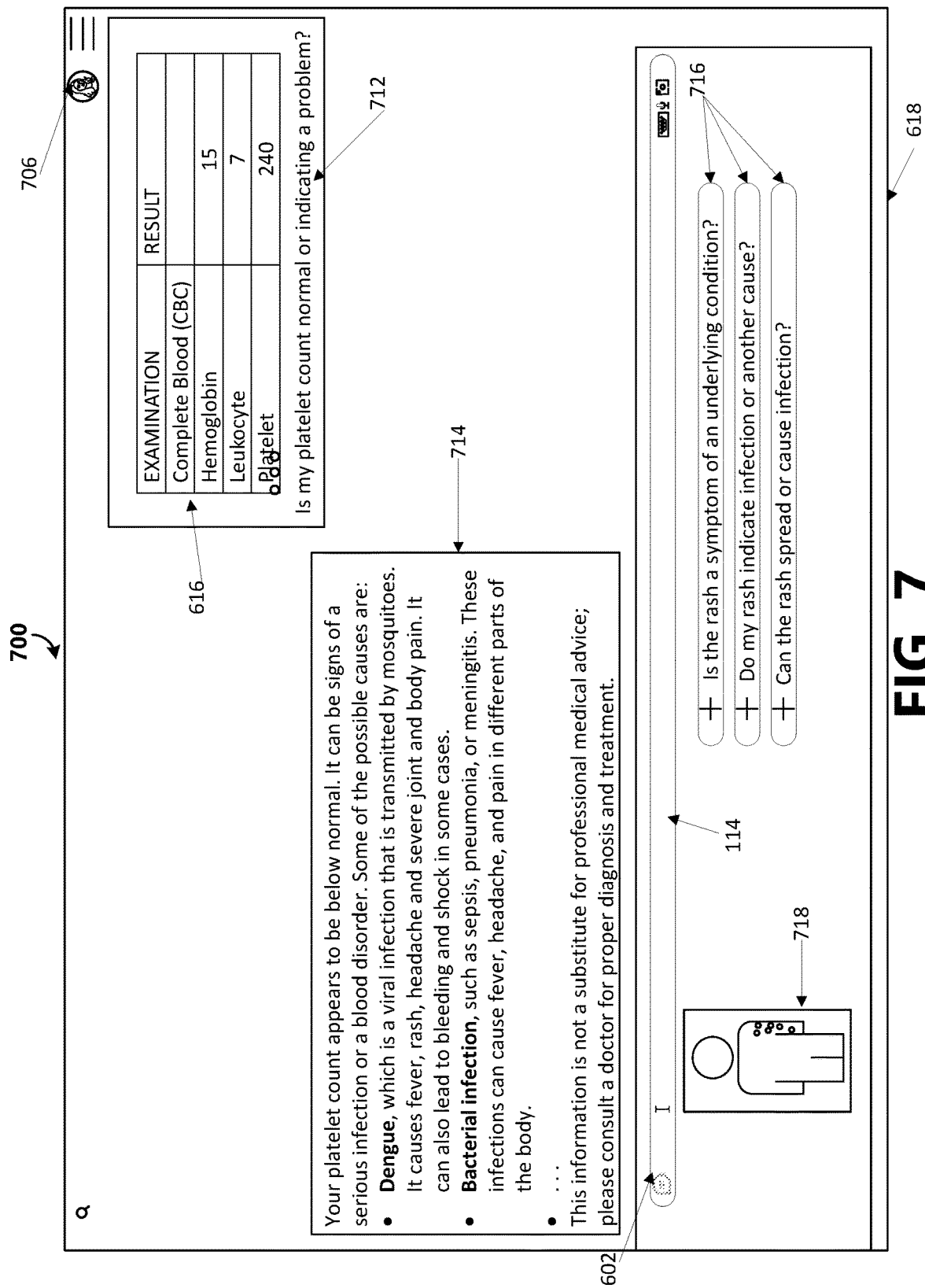
FIG. 7 depicts another example interface for generating autocomplete text suggestion.

FIG. 7 depicts another example interface 700. The interface 700 is substantially similar to the interface 600 and represents a next turn in an interaction with the application. The interface 700 includes the application interface 618, a chat interface 602, a current user 706, a query based on the uploaded image 616, a prior-turn input query 712, a response 714 to the query, a new input image 718, and new generated questions 716.

For example, interface 700 depicts a scenario where a selection of the potential question of "Is my platelet count normal or indicating a problem?" has been selected. In such a scenario, the inputs from the prior turn are shown in a segment of the interface 700. In the example depicted, the prior turn shown the prior-turn input image 616 (e.g., the picture of the report) and the prior-turn text input 712. The application processes the input to generate a response, which is shown in response 714. The interface 700 then presents an interface to continue interacting with the application for a next turn, which is now the current turn. For instance, the interface continues to show an input field 114 where input can again be entered by the user.

In the example depicted, the user has entered a second input image 718, which is a picture of a rash on a body. In the current state depicted, no further input text has been entered. As such, a zero-input prefix scenario is again occurring. Thus, the technology utilizes a zero-input prompt. The zero-input prompt includes an image description of the second input image 718. In some examples, the zero-input prompt also includes the conversation history, which in this examples includes the response 714, the prior text input 712, a description of the prior-turn input image 616. The language model then again generates potential questions 716 for the current turn which are surfaced. Similar to the prior turn discussed above with reference to FIG. 6, one of the potential questions may be selected or input text may be received in the input field.

Figure 8:
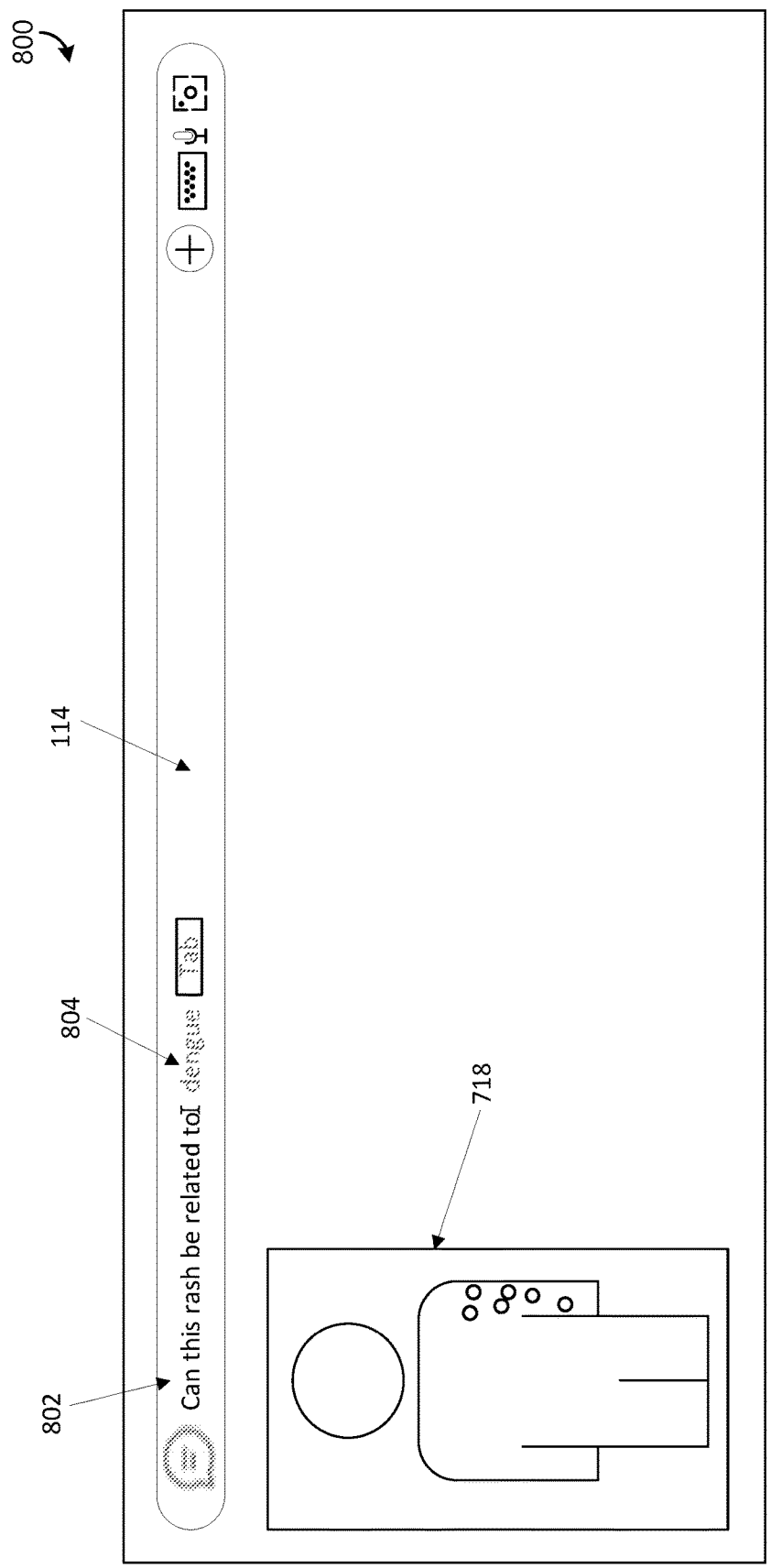
FIG. 8 depicts another example interface for generating autocomplete text suggestion.

FIG. 8 depicts an example interface 800 for generating autocomplete text where an input prefix is received into the input field 114. For instance, continuing with the example discussed above with reference to FIGS. 6-7, a user may begin entering a text prefix into the input field rather than selecting one of the potential questions 716. The interface 800 is similar to the interfaces 600, 700 discussed above.

The interface depicts the received input text prefix 802 that has been entered into the input field. In the example depicted, the entering of the text prefix 802 causes the new generated questions 716 to be removed from the display. In other examples, however, the new generated questions 716 may be concurrently displayed with the text prefix 802. Because the text prefix 802 has been entered, a non-zero-input scenario occurs and autocomplete text 804 is generated based on a non-zero-input prompt. The non-zero-input prompt includes the text prefix and an image description for the second input image 718. In some examples, the non-zero-input prompt further includes the contextual history from the prior turns, such as the prior response, the prior text input, and/or the image description of the prior-turn image. The language model processes the non-zero-input prompt and generates the autocomplete text 804 (e.g., dengue). The autocomplete text 804 is then surfaced as a suffix to the text prefix 802. In the example depicted, the autocomplete text 804 is displayed in a format different from the text prefix 802. For instance, the autocomplete text may be displayed in a lighter font than the prefix text and therefore may be referred to as a next-word ghosting.

Figure 9:
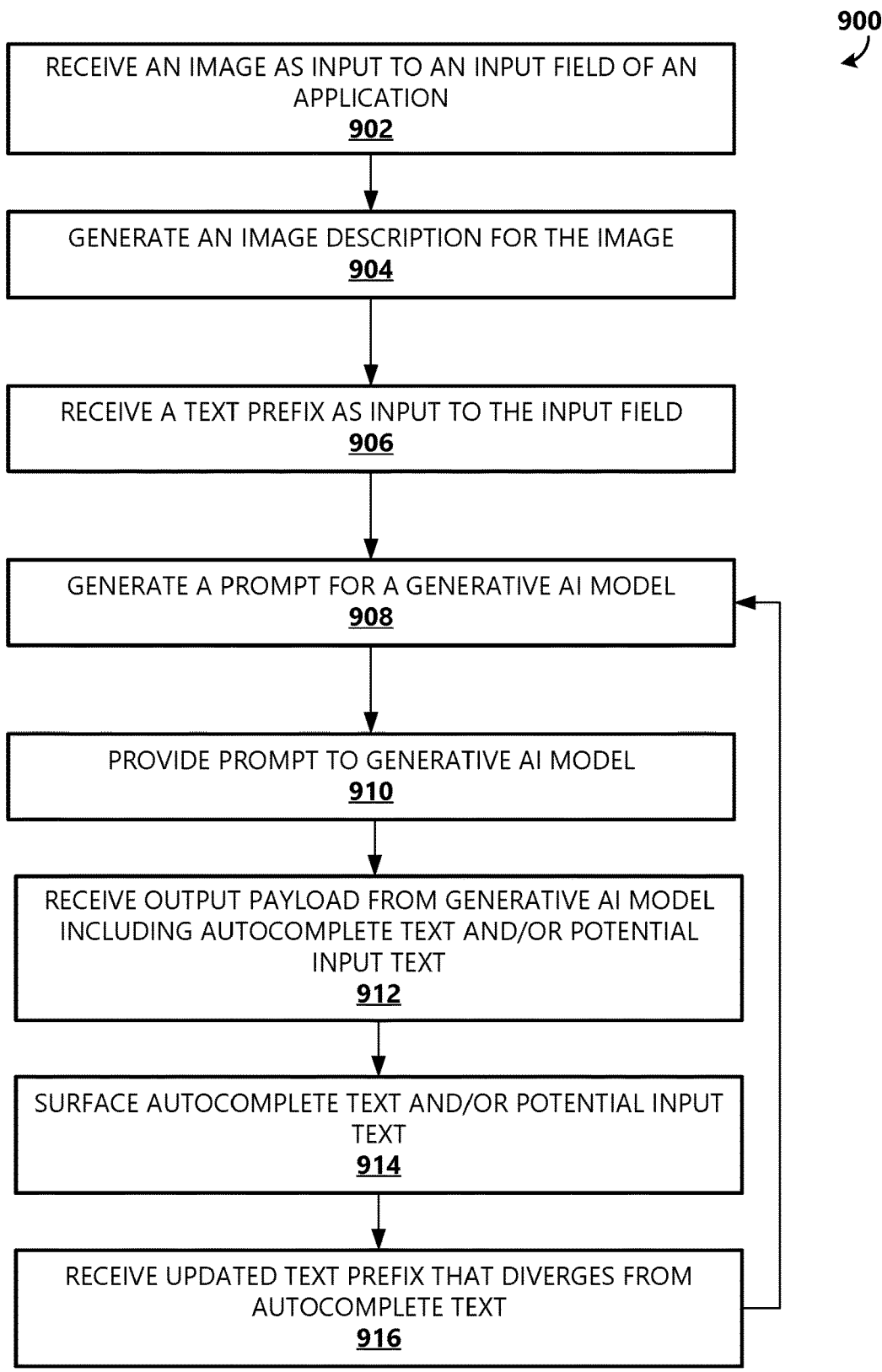
FIG. 9 depicts an example method of generating autocomplete text suggestion.

FIG. 9 depicts an example method 900 of generating autocomplete text using a language model. The operations of method 900 may be performed by one or more of the systems, or components thereof, discussed herein. For instance, method 900 may be performed by a web-based service (e.g., search or chat service) operated on a remote server. In other examples, the method 900 may be performed by an application of a local device, such as a web browser operating on a personal computing device.

At operations 902, an image is received as input to an input field of an application. The input field may be a search field of a search engine. The search engine may have a chat user-interface such as a chatbot. The input field may similarly be a search and/or chat interface of an application, such as a web browser.

At operation 904, an image description is generated for the image received as input. The image description may be generated by the methods and processes discussed herein, such as by generating the image description through the use of a generative AI model or by comparing embeddings of the input image to embeddings of previously described images. For instance, an embedding may first be generated for the input image. The embedding for the input image is then compared to embeddings for other images. The comparison indicates that there is likely a matching image to the current image (e.g., a similarity metric exceeds a similarity threshold), the image description for the input image is retrieved from a database and used as the image description for the input image. If the comparison indicates that there is not a matching image, the input image is incorporated into an image generation prompt. The image generation prompt is provided as input to a generative AI model which processes the image generation prompt (and the input image included therein) to generate an output payload that includes an image description for the image. That image description is then used as the image description for the input image. The image description and the embedding are then stored for later comparisons and use.

At operation 906, a text prefix may be received as input to the input field. The text-prefix entered by the user. In other examples, a text prefix is not received, and operation 906 is omitted from method 900.

At operation 908, a prompt for a generative AI model, such as a language model, is generated. The prompt may be generated based on whether a text prefix was received in operation 906. For instance, if a text prefix was received, a non-zero-input prompt is generated. If a text prefix was not received, a zero-input prompt is generated. For the non-zero-input prompt, a non-zero-input prompt template is populated with the image description and the text prefix to form the non-zero-input prompt. For the zero-input prompt, zero-input prompt template is populated with the image description.

For both the non-zero-input prompt and the zero-input prompt, contextual history may also be incorporated into the prompt. The contextual history may be accessed at a user level or at a conversation level. For example, a user ID may be associated with a current user. In some instances, a conversation ID may be associated with the current conversation with the chatbot. Details associated with the user and the current conversation may then be stored and identified by the respective IDs. Thus, the details for the conversation history may be retrieved based on the conversation ID and/or the user ID.

At operation 910, the prompt that was generated in operation 908 is provided as input to the generative AI model. The generative AI model then processes the prompt to generate autocomplete text (e.g., for a non-zero-input scenario) and/or potential input text (e.g., for a zero-input scenario) based on the details included in the prompt. An output payload including the autocomplete text and/or the potential input text is then received at operation 912.

At operation 914, the autocomplete text and/or the potential input text are surfaced (e.g., displayed or caused to be displayed). For instance, the autocomplete text may be displayed as a suffix to the text prefix. The autocomplete text may be displayed in a different format than the text prefix. An input from the user may then be received that accepts and/or enters the autocomplete text. For instance, a touch, click, keyboard entry (e.g., right arrow) may be received to accept the autocomplete text, which causes the autocomplete text to be included with the text prefix as the input. Providing a single-input option for accepting the autocomplete text reduces the number of input/output signals (e.g., from a keyboard, touchscreen, mouse) that need to be processed to form the full input. Accepting the autocomplete text in such a manner similarly reduces the likelihood for typographical errors to be entered, which would potentially lead to less accurate results or a need to process the input a second time without the typographical error.

The potential input text may be displayed adjacent to or within an input field. The potential input text may be a set of suggested or potential queries or suggestions. The potential input text may be surfaced as a selected UI element. A selection of the input text may then be received as a single click, touch, keyboard entry, etc. The selection causes the potential input text to be processed as an input without having to receive the individual keystrokes associated that would be required for a typed entry of the input. Such a selection avoids the processing of those individual keystrokes and the generation of the autocomplete text, as described herein, that is triggered upon the receipt a text prefix. As a result, processing resources associated with such additional operations and calls to the generative AI model may be reduced or otherwise conserved.

At operation 916, an updated text prefix is received, such as an additional character to the text prefix. In examples, where the additional character matches the autocomplete text, no further actions are taken. For instance, in the example of the text prefix being "Can this rash be related to" and the autocomplete text being "dengue," a receipt of another character of "d" would not trigger new or different autocomplete text to be generated. If the updated text prefix (e.g., additional character), however, diverges from the autocomplete text, the method 900 returns to operation 908 where a new prompt is generated for the updated text prefix to generate new autocomplete text. For instance, using the same example above, if the next character received was "g" instead of "d", the updated text no longer matches the autocomplete text and new autocomplete text needs to be generated. By generating new autocomplete text only upon a diversion from the current autocomplete text, computing resources are conserved.

FIG. 10 is a block diagram illustrating physical components (e.g., hardware) of a computing device 1001 with which examples of the present disclosure may be practiced. The computing device components described below may be suitable for one or more of the components of the systems described above. In a basic configuration, the computing device 1001 includes at least one processing unit 1002 and a system memory 1004. Depending on the configuration and type of computing device 1001, the system memory 1004 may comprise volatile storage (e.g., random access memory), non-volatile storage (e.g., read-only memory), flash memory, or any combination of such memories. The system memory 1004 may include an operating system 1005 and one or more program modules 1006 suitable for running software applications 1050 (e.g., one or more messaging applications 112, preference aggregators 1002, and/or feedback generators) and other applications.

The operating system 1005 may be suitable for controlling the operation of the computing device 1001. Furthermore, aspects of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1001 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 may perform processes including one or more of the stages of the methods and processes discussed herein, such as method 900 depicted in FIG. 9. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to detecting an unstable resource may be operated via application-specific logic integrated with other components of the computing device 1001 on the single integrated circuit (chip). Examples of the present disclosure may also be practiced using other technologies capable of performing logical operations such as, for example, AND, OR, and NOT, including mechanical, optical, fluidic, and quantum technologies.

The computing device 1001 may also have one or more input device(s) 1012 such as a keyboard, a mouse, a pen, a sound input device, a touch input device, a camera, etc. The output device(s) 1014 such as a display, speakers, a printer, etc. may also be included. The aforementioned devices are examples and others may be used. The computing device 1001 may include one or more communication connections 1016 allowing communications with other computing devices 1018. Examples of suitable communication connections 1016 include RF transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 1004, the removable storage device 1009, and the non-removable storage device 1010 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1001. Any such computer readable media may be part of the computing device 1001. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

In an aspect, the technology relates to a computer-implemented method for generating autocomplete text. The method includes receiving an image as input at an input field of an application; generating an image description for the image; receiving a text prefix as input at the input field; generating a prompt including the image description and the text prefix; providing the prompt as input to a language model; receiving, from the language model in response to the prompt, autocomplete text for the text prefix; and surfacing the autocomplete text as a suffix to the text prefix, wherein the autocomplete text is displayed in a different format than the text prefix.

In an example, the image and the input text are received in an input field of a web browser. In another example, generating the image description for the image further includes generating an image embedding for the image; and comparing the image embedding to embeddings of prior images for which a description has been previously generated. In a further example, the method also includes, based on the comparison indicating a matching prior image, retrieving the image description of a matching prior image from a database. In still another example, the method further includes, based on the comparison indicating no matching prior image, receiving the image description from a generative artificial intelligence (AI) model. In a further example, the embeddings of prior images are stored in a database, and the method further comprises adding the embedding for the input image to the database.

In yet another example, the prompt further includes contextual history. In a further example, the contextual history includes an image description of a prior image in a current conversation. In another example, the contextual history includes a response from a prior turn in a current conversation. In still another example, the contextual history includes browsing history. In still yet another example, the method further includes receiving an additional character to the text prefix, thereby forming an updated text prefix; determining that the additional character diverges from the autocomplete text; based on the additional character diverging from the autocomplete text, generating a second prompt including the updated text prefix and the image description; providing the second prompt as input to the language model; and receiving, from the language model in response to the second prompt, updated autocomplete text for the text prefix.

In another aspect, the technology relates to a system for generating autocomplete text. The system includes at least one processor; and memory storing instructions that, when executed by the at least one processor, cause the system to perform operations. The operations include receiving an image as input at an input field of an application; generating an image description for the image; generating a prompt including the image description; providing the prompt as input to a language model; receiving, from the language model in response to the prompt, at least one of autocomplete text or potential input text; and surfacing the at least one of the autocomplete text or the potential input text.

In an example, a text prefix is not received, and generating the prompt includes: accessing a zero-input prompt template, wherein the zero-input prompt template includes instructions for generating the potential text input without use of a text prefix; and populating the zero-input prompt template with the image description to form the prompt. In another example, the potential text input are generated suggested questions, surfaced adjacent the input field, that may be provided as input. In another example, the operations further comprise receiving a text prefix in the input field, and generating the prompt includes: accessing a non-zero-input prompt template, wherein the non-zero-input prompt template includes instructions for generating the autocomplete text; and populating the non-zero-input prompt template with the image description and the text prefix to form the prompt. In a further example, the autocomplete text is surfaced as a suffix to the text prefix. In yet another example, the image description is generated by providing the image to a generative AI model.

In another aspect, the technology relates to a system for generating autocomplete text. The system includes at least one processor; and memory storing instructions that, when executed by the at least one processor, cause the system to perform operations. The operations include receiving an image as input at an input field of an application; generating an image description for the image; generating a zero-input prompt including the image description; providing the zero-input prompt as input to a language model; receiving, from the language model in response to the zero-input prompt, potential input text; surfacing the potential input text; receiving a text prefix in the input field; generating a non-zero-input prompt including the image description and the text prefix; providing the non-zero-input prompt as input to the language model; receiving, from the language model in response to the non-zero-input prompt, autocomplete text; and surfacing the autocomplete text as a suffix to the text prefix.

In another example, the operations further include, in response to surfacing the autocomplete text, removing the potential input text from display. In yet another example, the potential input text includes a plurality of questions, and surfacing the questions includes displaying a selectable user interface element for each of the questions.

It is to be understood that the methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Illustrative non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Examples of transmission media include coaxial cables, fiber-optic cables, copper wires, and wireless media, such as radio waves.

Furthermore, those skilled in the art will recognize that boundaries between the functionality of the above-described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A computer-implemented method for generating autocomplete text, comprising:
    generating an image description for an image received as user input to an input field of an application;
    generating an autocomplete-request prompt, for a language model, requesting autocomplete text for a text prefix entered as user input to the input field of the application, the autocomplete-request prompt including the image description and the text prefix;
    providing the autocomplete-request prompt as input to the language model;
    receiving, from the language model in response to the autocomplete-request prompt, the requested autocomplete text for the text prefix; and
    surfacing the autocomplete text as a suffix to the text prefix, wherein the autocomplete text is displayed in a different format than the text prefix.

2. The computer-implemented method of claim 1, wherein the image and the prefix text are received in an input field of a web browser.

3. The computer-implemented method of claim 1, wherein generating the image description for the image further comprises:
    generating an image embedding for the image; and
    comparing the image embedding to embeddings of prior images for which a description has been previously generated.

4. The computer-implemented method of claim 3, further comprising, based on the comparison indicating a matching prior image, retrieving the image description of a matching prior image from a database.

5. The computer-implemented method of claim 3, further comprising, based on the comparison indicating no matching prior image, receiving the image description from a generative artificial intelligence (AI) model.

6. The computer-implemented method of claim 5, wherein the embeddings of prior images are stored in a database, and the method further comprises adding the embedding for the input image to the database.

7. The computer-implemented method of claim 1, wherein the autocomplete-request prompt further includes contextual history.

8. The computer-implemented method of claim 7, wherein the contextual history includes an image description of a prior image in a current conversation.

9. The computer-implemented method of claim 7, wherein the contextual history includes a response from a prior turn in a current conversation.

10. The computer-implemented method of claim 7, wherein the contextual history includes browsing history.

11. The computer-implemented method of claim 1, further comprising:
receiving an additional character to the text prefix, thereby forming an updated text prefix;
determining that the additional character diverges from the autocomplete text;
based on the additional character diverging from the autocomplete text, generating a second autocomplete-request prompt including the updated text prefix and the image description;
providing the second autocomplete-request prompt as input to the language model; and
receiving, from the language model in response to the second autocomplete-request prompt, updated autocomplete text for the text prefix.

12. A system for generating autocomplete text, comprising:
at least one processor; and
memory storing instructions that, when executed by the at least one processor, cause the system to perform operations comprising:
generating an image description for an image provided as user input to an input field of an application;
generating an artificial intelligence (AI) prompt for a language model, the AI prompt requesting at least one of autocomplete text or potential input text, the AI prompt including the image description;
providing the AI prompt as input to the language model;
receiving, from the language model in response to the AI prompt, the requested at least one of autocomplete text or potential input text; and
surfacing the at least one of the autocomplete text or the potential input text.

13. The system of claim 12, wherein a text prefix is not received, and generating the AI prompt includes:
accessing a zero-input prompt template, wherein the zero-input prompt template includes instructions for generating the potential text input without use of a text prefix; and
populating the zero-input prompt template with the image description to form the AI prompt.

14. The system of claim 13, wherein the potential text input are generated suggested questions, surfaced adjacent the input field, that may be provided as input.

15. The system of claim 12, wherein the operations further comprise receiving a text prefix in the input field, and generating the AI prompt includes:
accessing a non-zero-input prompt template, wherein the non-zero-input prompt template includes instructions for generating the autocomplete text; and
populating the non-zero-input prompt template with the image description and the text prefix to form the AI prompt.

16. The system of claim 15, wherein the autocomplete text is surfaced as a suffix to the text prefix.

17. The system of claim 12, wherein the image description is generated by providing the image to a generative AI model.

18. A system for generating autocomplete text, comprising:
at least one processor; and
memory storing instructions that, when executed by the at least one processor, cause the system to perform operations comprising:
receiving an image as user input at an input field of an application;
generating an image description for the image;
generating a zero-input prompt for a language model, the zero-input prompt requesting potential input text and including the image description;
providing the zero-input prompt as input to a language model;
receiving, from the language model in response to the zero-input prompt, the requested potential input text;
surfacing the potential input text;
receiving a text prefix in the input field;
generating a non-zero-input prompt for the language model, the non-zero-input prompt requesting autocomplete text for the text prefix and including the image description and the text prefix;
providing the non-zero-input prompt as input to the language model;
receiving, from the language model in response to the non-zero-input prompt, the requested autocomplete text; and
surfacing the autocomplete text as a suffix to the text prefix.

19. The system of claim 17, wherein the operations further comprise, in response to surfacing the autocomplete text, removing the potential input text from display.

20. The system of claim 17, wherein the potential input text includes a plurality of questions, and surfacing the questions includes displaying a selectable user interface element for each of the questions.

* * * * *